July 2, 1968  V. R. NELSON  3,390,792
PRESS LOADER AND UNLOADER
Filed Dec. 6, 1966  4 Sheets-Sheet 1

Victor R. Nelson
INVENTOR
BY
Agent

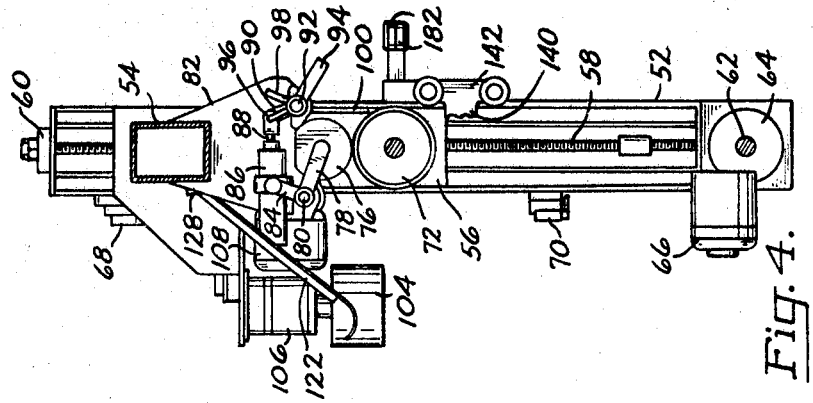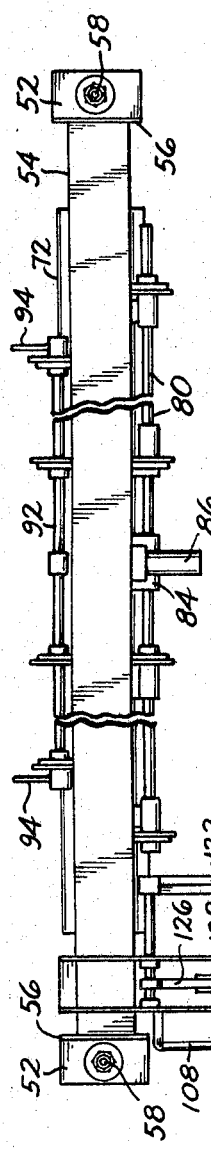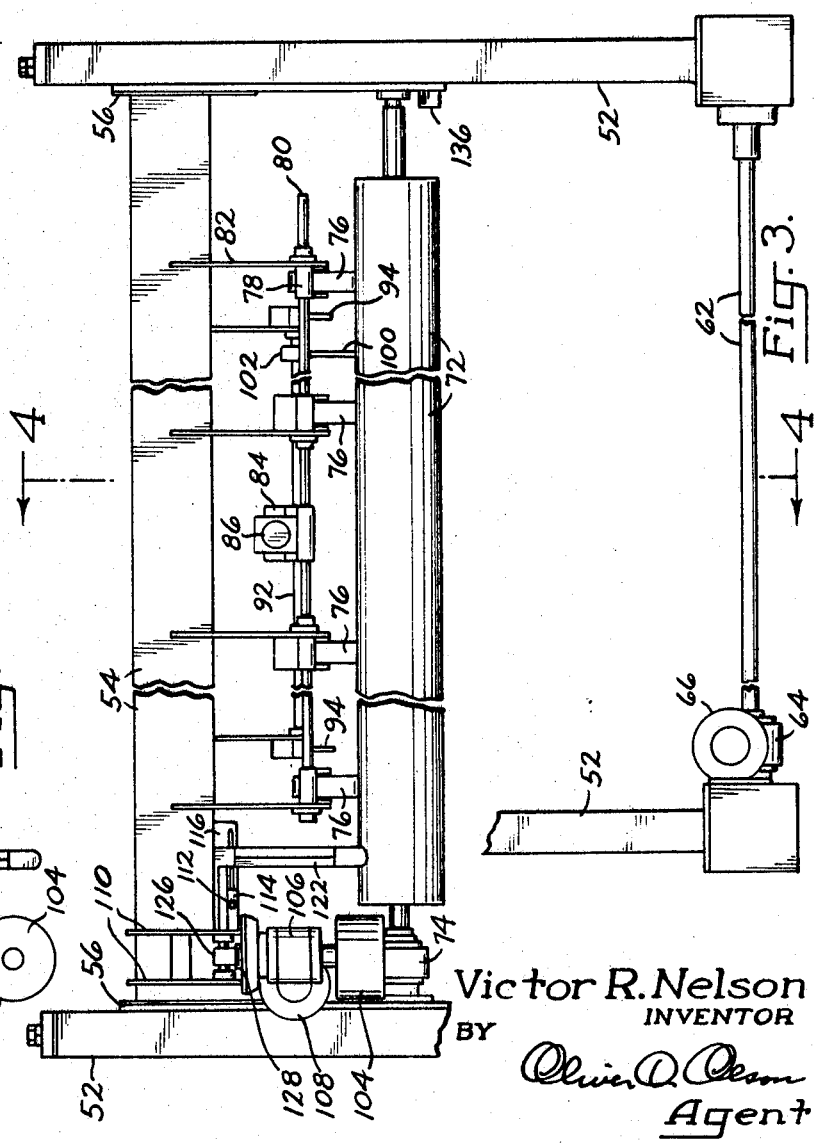

Victor R. Nelson
INVENTOR

BY
Agent

Victor R. Nelson
INVENTOR

3,390,792
PRESS LOADER AND UNLOADER
Victor R. Nelson, 7710 N. Denver Ave.,
Portland, Oreg. 97217
Filed Dec. 6, 1966, Ser. No. 599,552
10 Claims. (Cl. 214—95)

ABSTRACT OF THE DISCLOSURE

Hot press panel loading and unloading apparatus having indexing mechanisms associating the spaces between panel press platens with panel loading mechanism and panel unloading mechanism for moving the latter mechanisms stepwise to succeeding platen openings. The unloading and loading mechanisms operate simultaneously to unload a pressed panel from one platen opening while a prepressed panel is being loaded into the next adjacent platen opening from which a pressed panel has just previously been unloaded.

Background of the invention

This invention relates to apparatus for direct loading and unloading a panel press of the multiple platen type employed in the manufacture of plywood, particle board and other panel material.

In the manufacture of plywood, for example, the loading and unloading of the hot press heretofore has been accomplished essentially by one of two procedures. One of these involves simply loading and unloading each platen opening by hand. This manual procedure is costly, both from the standpoint of labor and of reduced production volume. A second procedure involves the use of a charger and "pie rack" adjacent the infeed and outfeed ends of the platen openings. The press loading charger is filled with panels by hand during the time that a preceding group of panels is being pressed. Following such pressing, the press is opening and the pressed panels are removed simultaneously to the unloading pie rack and the unpressed panels in the loading charger are transferred simultaneously to the press. Although this procedure provides increased production volume, the charger and pie rack represent a substantial cost and they occupy considerable space.

Summary of the invention

The present invention overcomes the foregoing disadvantages of the prior art by providing loading and unloading apparatus which occupies a minimum of space adjacent a press, and which requires but a single operator since all operations other than feeding the panels to the press loading mechanism are sequenced automatically.

The apparatus of the present invention also functions to position the loading and unloading mechanisms precisely with respect to the press platen openings, so that the latter may be adjusted to minimum opening dimensions. Accordingly, the number of platens in the press may be increased considerably over the number normally capable of use with loading and unloading apparatus of the prior art. This increase in the number of platens correspondingly increases the productivity of the press.

The apparatus of the present invention also includes unloading mechanism, which, by virtue of its parallelogram construction, assures unloading of the press with speed and precision, and permits it to be mounted closely adjacent the press, thereby minimizing the amount of floor space required for the apparatus.

The foregoing advantages of the present invention are achieved by apparatus which is of simplified and rugged construction for economical manufacture and long service life with a minimum of maintenance and repair.

The foregoing and other objectives and advantages of the present invention will appear from the following detailed description taken in connection with the accompanying drawings of the preferred embodiment.

Brief description of the drawings

FIG. 2 is a foreshortened plan view of the infeed and ejector portion of the apparatus shown in the lower right hand portion of FIG. 1.

FIG. 3 is a foreshortened front elevation as viewed from the bottom in FIG. 2.

FIG. 4 is a vertical sectional view taken on the line 4—4 in FIG. 3.

Description of the preferred embodiment

Figure 1:
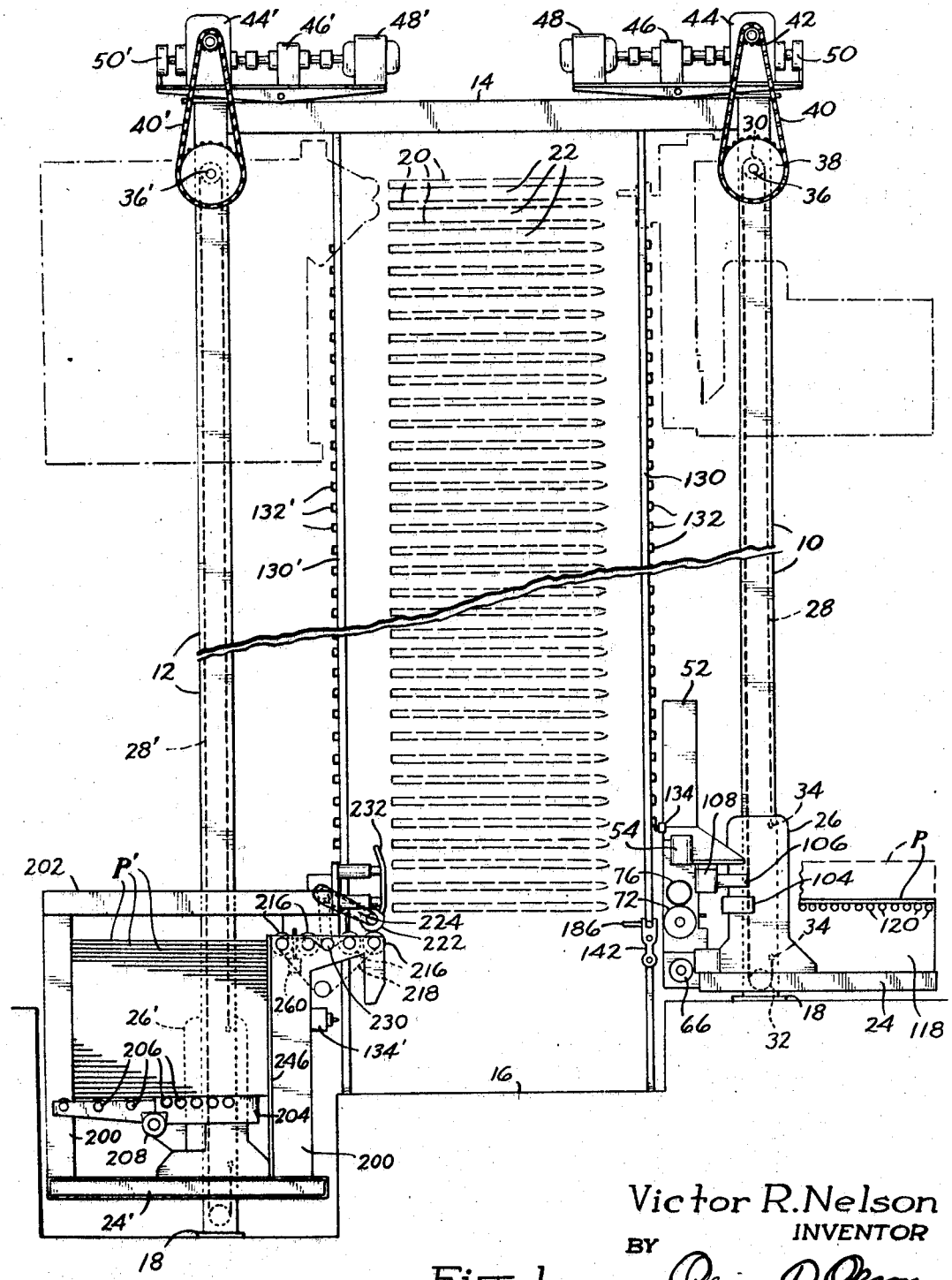
FIG. 1 is a foreshortened side elevation of panel loading and unloading apparatus embodying the features of the present invention, the same being shown in association with a multiple platen press illustrated schematically in dash lines.

Referring particularly ot FIG. 1 of the drawings, the apparatus of the present invention includes a supporting framework which comprises a pair of upstanding, laterally spaced front beams 10 and a corresponding pair of rear beams 12, all interconnected adjacent their upper ends by the rectangular assembly of horizontal beams 14. The lower ends of the upstanding beams are anchored to a concrete or other suitable foundation 16 by such means as the base plate 18.

The upstanding framework is adapted to straddle and confine therein a conventional panel press which is illustrated in dash lines by the plurality of vertically movable press platens 20. These are shown in their open positions providing between them press platen openings 22 into which panels may be introduced for pressing and from which pressed panels may be ejected to the unloader component of the apparatus.

Mounted for vertical movement between the laterally spaced front beams 10 is a loading hoist. This hoist includes a platform 24 secured to a pair of laterally spaced guide plates 26 one positioned adjacent each of the front beams. Guide rollers (not shown) on the guide plates engage the beams to stabilize the hoist. Within each beam is an elongated drive chain 28 trained over the upper and lower sprockets 30 and 32 and secured, as by the anchors 34, to the associated guide plate 26. The upper sprocket 30 is secured to a shaft 36 journaled for rotation adjacent the upper ends of the front beams. Also secured to this shaft is a sprocket 38 which engages a drive chain 40 trained over the sprocket 42 on the output shaft of a gear reduction unit 44.

The input shaft of the gear reduction unit is connected through a magnetic clutch brake 46 to the output shaft of an electric drive motor 48. The magnetic clutch brake functions upon a signal from control circuitry to secure the shaft against rotation, and to release the latter upon receiving another signal from the control circuitry.

Additional fail safe means preferably is provided to assure against accidental release of the hoist from an elevated position, in the event of electrical power failure. To this end there is connected to the input shaft extension of the gear reduction unit 44 a commercially available brake 50 of the type which is held in release position by means of air pressure and which is actuated to braking position by means of spring pressure. By supplying compressed air through an electrically operated pressure switch the safety brake normally is released. However, upon the occurrence of an electrical power failure to the air pressure switch circuitry, eliminating air pressure to the brake, the spring moves the brake immediately to its braking position. The hoist thus is secured in its position of elevation until electrical power is restored.

Supported upon the loading hoist for movement therewith is a panel infeed and ejector assembly. This assembly is mounted upon a carriage which, in turn, is supported by a frame which includes a pair of laterally spaced upstanding hollow posts 52 mounted at their lower ends on the hoist platform 24. The carriage comprises a horizontal transverse beam 54 (FIGS. 2, 3 and 4) secured to its ends to laterally spaced plates 56 positioned adjacent the inner sides of the posts. Outwardly projecting lugs on the plates extend into the hollow posts and are provided with vertically extending threaded openings through which the elongated threaded drive rods 58 extend. The upper ends of the drive rods are journaled in bearings 60 at the upper ends of the posts, and their lower ends are connected through appropriate gearing (not shown) to the output shaft 62 of a gear reduction unit 64. The input shaft of this unit is connected to the driven shaft of the electric motor 66. Thus, upon activation of the motor the drive rods 58 are rotated and the carriage and supported assembly are moved in the corresponding direction vertically relative to the posts 52. The limits of vertical travel of this assembly are established by the microswitches 68 and 70 in the electric circuit of motor 66.

Supported between the plates 56 is a horizontal infeed roll 72 connected at one end to the electric gear head motor 74. The motor preferably is of the variable speed type in order to accommodate a variable infeed rate of panels to the press.

A plurality of laterally spaced pinch rolls 76 are positioned above the infeed roll and mounted each on one end of an arm 78. The arms are mounted for rotation with a transverse shaft 80 journaled in bearings supported at the lower ends of a plurality of laterally spaced brackets 82 secured to the horizontal beam.

Also secured to the shaft 80 is an actuating arm 84 in the form of a yoke. The yoke is joined pivotally to a ring secured to an air cylinder 86 in which a piston reciprocates. The extending end of the piston rod 88 is connected pivotally to an arm 90 which is secured to a transverse shaft 92. Also secured to this shaft in laterally spaced positions are a plurality of stop members 94. These stop members are movable upon rotation of their supporting shaft between the retracted position illustrated in FIG. 4 and an operative position at which they extend vertically downward below the upper surface of the driven infeed roll 72 to intercept the path of movement of a panel. In this operative position the stop members thus serve to align the leading edge of the panel parallel to the infeed roll, thereby insuring precise delivery of the panel into the press platen opening.

It is to be noted that the stop members 94 are moved to their operative position by outward extension of the piston rod 88 relative to the cylinder 86, by the application of air under pressure to the rearward side of the piston. Upon such extension of the piston rod, determined by abutment of the lug 96 against the stop 98, the continued application of air under pressure causes the cylinder to move rearwardly, thereby effecting counterclockwise rotation of the shaft 80 and consequent elevation of the pinch rolls 76 above the infeed roll 72. In this position of the pinch rolls the panel is fed into abutment with the stop members 94 by the driven infeed roll. As the leading edge of the panel moves into abutment with the stop members, it engages the actuating finger 100 of an electric microswitch 102. This microswitch is connected in the electric circuit of a solenoid valve which controls the admission of air under pressure selectively to the opposite ends of the cylinder 86. Accordingly, the solenoid valve is actuated to apply air under pressure to the forward end of the cylinder, thereby retracting the stop members and lowering the pinch rolls into rolling contact with the upper surface of the panel. The latter thereupon is delivered forwardly into the press platen opening.

Means is provided for guiding one edge of the panel P which is perpendicular to the leading edge, in order to align said edge properly with respect to the corresponding side of the press. In the embodiment illustrated, this means is provided by a driven guide roll 104 supported for rotation on the vertical axis of the output shaft of a gear reduction unit 106 connected to the electric motor 108. This assembly is mounted upon a pair of brackets 110 which slidably engage the transverse beam 54. Adjustment of this guide roll 104 relative to the longitudinal axis of the infeed roll is provided in order to accommodate the centering of panels of varying length in the press. The guide roll is secured in its selected position of adjustment by means of a clamping bolt 112 which extends through a flange 114 on one of the brackets 110 and a corresponding slotted bracket 116 on the beam.

The loader hoist platform 24 supports an infeed roll case conveyor which, in the illustrated embodiment, comprises a framework 118 supporting a plurality of conveyor rolls 120 which terminate closely adjacent the infeed roll 72. The infeed conveyor is adapted to support a stack of panels P to be direct loaded.

Means is provided for moving the carriage 54 and supported infeed assembly vertically relative to the infeed hoist platform 24, to align the uppermost panel P of a stack supported upon the infeed roll case conveyor 120 with the upper surface of the infeed roll 72. In the embodiment illustrated, a feeler arm 122 is mounted on a shaft 124 journaled in bearings carried by the brackets 110. The projecting end of the feeler arm is disposed for engagement with the upper panel of the stack. The shaft also mounts the actuating arm 126 of a microswitch 128 which is connected in the electric circuit of the drive motor 66. The feeler arm so arranged that when the upper panel in the stack is aligned horizontally with the upper surface of the infeed roll, the microswitch is actuated to deenergize the motor.

The loading hoist is indexed vertically stepwise to position the upper surface of the infeed roll 72 in alignment with each of the press platen openings 22. This is achieved in the embodiment illustrated (FIG. 1) by means of the elongated post 130 secured to the main frame member 14 and mounting a plurality of microswitch actuating blocks 132. These blocks are spaced apart a distance equal to the spacing between press platens when in open condition. Associated with these blocks is a microswitch 134 supported on one of the end plates 56 for movement with the infeed and ejector assembly, with its actuating arm arranged for engagement with the blocks. The microswitch is connected in the electric circuit of the hoist motor 48 and is arranged to deactivate the latter when the actuating arm engages one of the blocks. In this deactivated condition of the motor the upper surface of the infeed roll is aligned horizontally with one of the press platen openings.

Figure 5:
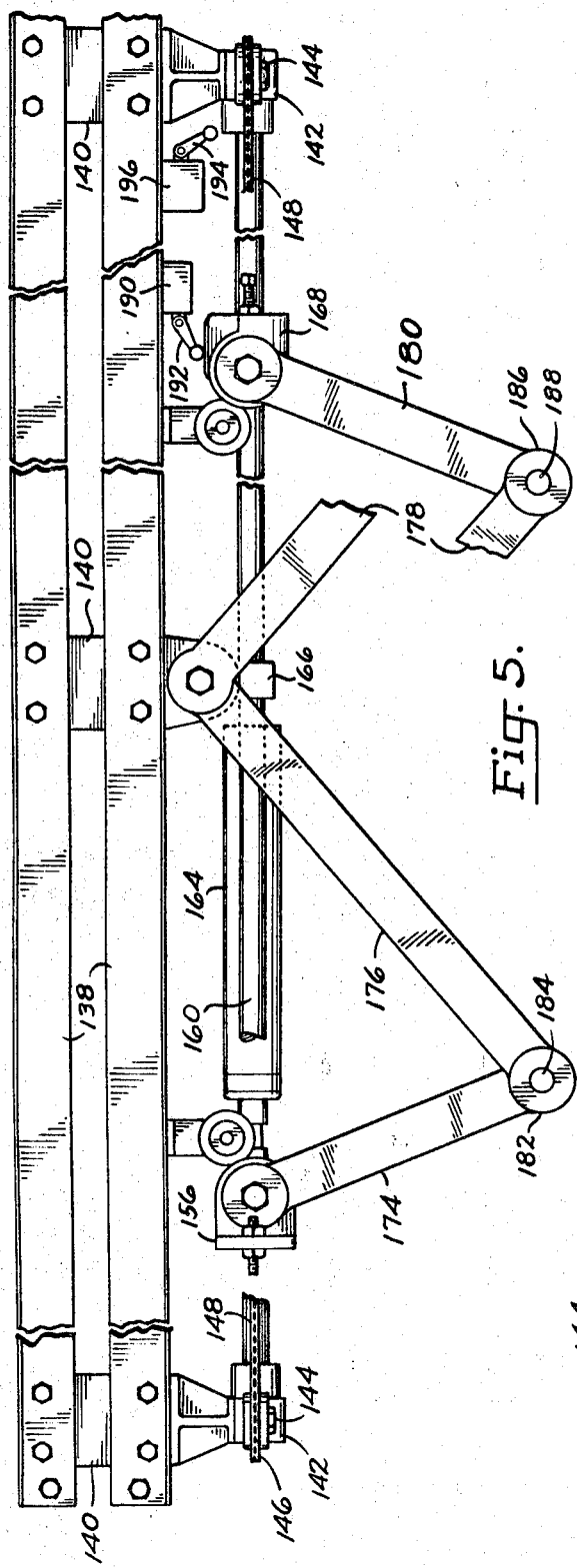
FIG. 5 is a foreshortened fragmentary plan view of the panel ejector mechanism.
Figure 6:
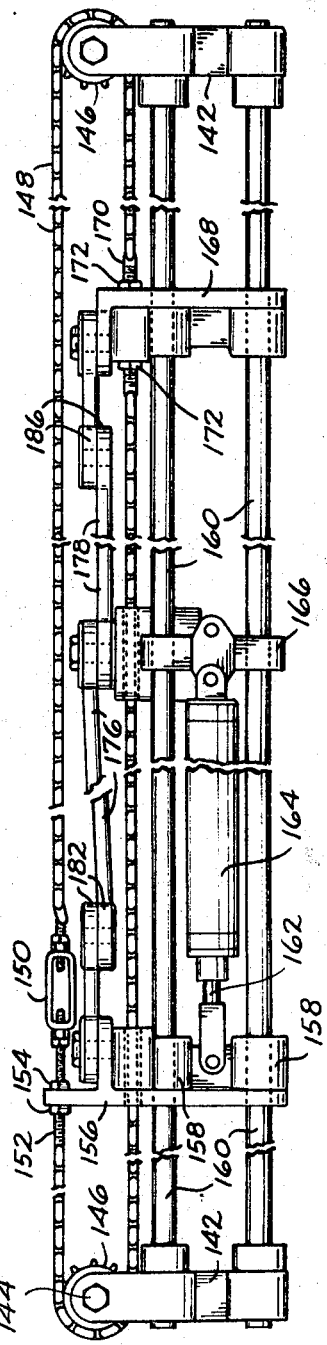
FIG. 6 is a foreshortened elevation as viewed from the bottom in FIG. 5.

Also supported for movement with the carriage is a panel ejector mechanism mounted between end brackets 136 (FIG. 3) secured to the end plates 56. As best illustrated in FIGS. 5 and 6, the ejector mechanism includes a pair of elongated support members 138 secured together in spaced relation by the interconnecting extensions 140 of bearing blocks 142 and secured to the end brackets 136. The forwardly projecting ends of the extensions 140 support a pair of bearing blocks 142 in which are journaled the shaft 144 supporting the end sprockets 146. A continuous chain 148 is trained over these sprockets, being adjusted to proper tightness by the interposed turnbuckle 150. Secured adjustably to a threaded portion 152 of the upper stretch of the continuous chain by the lock nuts 154 is a traveling block 156. Spaced guide sleeves 158 on this block receive slidably therethrough the elongated guide rods 160 anchored at their opposite ends in the bearing blocks 142. Another opening in the traveling block freely receives the lower stretch of the chain to accommodate relative movement.

The projecting end of a piston rod 162 extending from one end of the air cylinder 154 is pivotally connected to the traveling block 156. The opposite end of the cylinder is pivotally connected to a fixed block 166 secured to the guide bars 160 centrally of their ends. A second traveling block 168 is mounted for movement on the guide rods on the side of the fixed block 166 opposite the first traveling block 156, and the lower stretch of the chain is secured to this second block 168 by the interposed threaded rod 170 and lock nuts 172.

The threaded rods 152 and 170 and associated lock nuts serve to provide adjustment of the traveling blocks relative to the fixed block, for the purpose explained more fully hereinafter.

A plurality of panel ejector arms pivotally interconnect the traveling blocks and fixed block. Thus, the arm 174 is connected pivotally at one end to the first traveling block 156; the arms 176 and 178 are connected pivotally at one end to the fixed block 166; the arm 180 is connected pivotally at one end to the second traveling block 168; the opposite ends of the arms 174 and 176 are formed as pusher heads 182 and are connected together pivotally by the pin 184; and the opposite ends of the arms 178 and 180 are similarly formed as pusher heads 186 and are connected together pivotally by the pin 188.

By spacing the traveling blocks 156 and 168 at equal distances to opposite sides of the fixed block 166, by adjustment of the lock nuts on the threaded rods 152 and 170, the pusher heads 182 and 186 are positioned at equal distances from the guide rods 160, and will remain at equal distances as they move toward and away from the guide rods during actuation of the cylinder 164 to move the traveling blocks 156 and 168 outwardly and inwardly with respect to the fixed block 166.

The limit of inward movement of the traveling blocks is defined by the microswitch 190 (FIG. 5) whose actuating arm 192 is positioned for engagement by one of the traveling blocks at its desired limit of inward movement. This microswitch is connected in the electric circuit of a solenoid actuated valve which controls the delivery of air under pressure to the cylinder 164. Upon engagement of the actuating arm by the traveling block the microswitch is operated to effect delivery of air under pressure to the cylinder to cause extension of its piston rod. The parallelogram arrangement of arms thus is moved to the retracted position. In this retracted position the traveling block 168 engages the actuating arm 194 of a microswitch 196 which is connected in the main electrical circuit. Until this microswitch is actuated, by retraction of the arms, the sequence of operation of the apparatus is interrupted.

The parallelogram arrangement of arms provides for movement of the pusher heads between a retracted position closely adjacent the guide rods and an extended position (FIG. 5) a substantial distance within the press platen opening 22. In moving from the retracted position of a pressed panel in the press opening and move the panel forwardly toward the unloader mechanism to be described hereinafter.

The ejector mechanism is mounted in such manner that the pusher heads are aligned precisely with the press platen opening immediately below the opening which is aligned with the upper surface of the infeed roll 72. In this manner the ejector mechanism functions to remove a pressed panel from a press opening while a prepressed panel is being loaded into the press opening immediately above it. This procedure is repeated stepwise as the loading hoist is indexed downwardly from the top of the press.

Because of the precise positioning of the pusher heads in alignment with the press opening, and because of the minimum thickness provided by the superimposed pairs of pusher heads, the spacing between press platens in their open position may be reduced to a minimum. Accordingly, the number of press platens may be increased considerably over the number usable with loading and unloading apparatus of the prior art. The increased number of platens correspondingly increases the productivity of the press.

The apparatus also includes an unloading hoist assembly which preferably is similar in arrangement to the loading hoist assembly. Thus, the unloading hoist includes a platform 24' which is movable vertically between the laterally spaced rear beams 12 by means of the chain 28' and drive assembly illustrated. It is moved downwardly in stepwise increments for alignment with each of the press platen openings, by means of the blocks 132' supported on the post 130' and associated with the microswitch 134' connected in the electric circuit of the drive motor 48'.

The platform 24' supports an upstanding framework which comprises the vertical beams 200 and the interconnecting horizontal beams 202 at the upper ends thereof. Guided by this framework is a vertically adjustable outfeed conveyor platform 204 which supports a plurality of rollers 206 on which the pressed panels P' unloaded from the press are to be stacked. Some of these rollers are connected through a sprocket and chain assembly to an electric motor 208 which, when actuated, effects transfer of the stack of panels P' from the platform to an offbearing conveyor.

Figure 8:
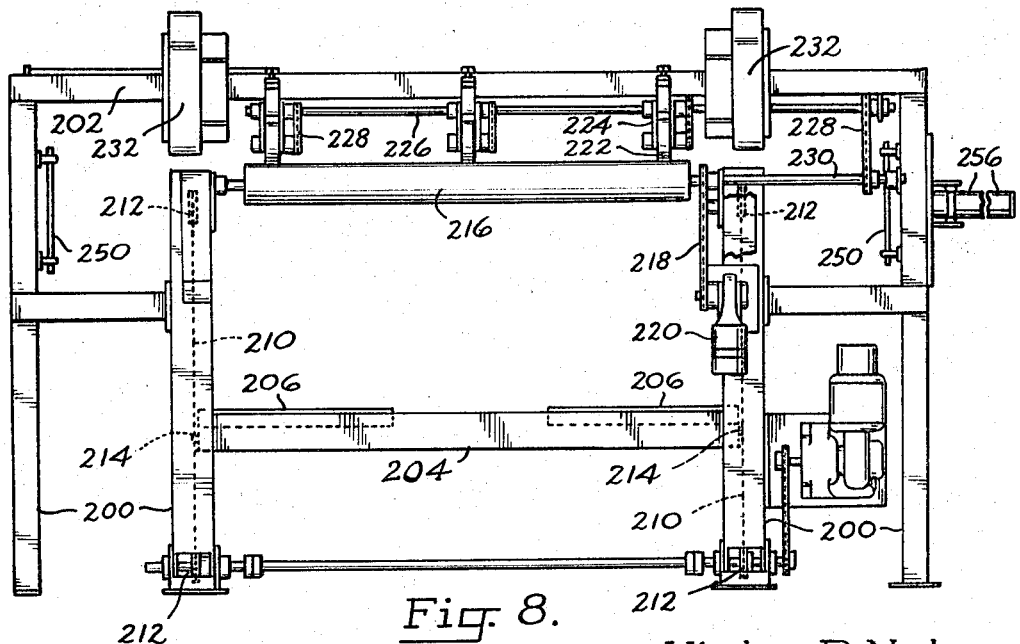
FIG. 8 is a foreshortened elevation as viewed from the bottom in FIG. 7.

Vertical movement of the conveyor platform 204 is achieved by means of chains 210 (FIG. 8) trained over sprockets 212 mounted in the vertical beams of the frame and driven by the electric motor. The chains are connected to the platform by anchors 214 in manner similar to the connection on the chains 28 to the loading platform side plates 26.

The framework supports a plurality of transverse outfeed rollers 216 all of which are disposed in a common horizontal plane and all of which preferably are driven by a common sprocket chain 218 connected to an electric motor 220. The driven roller closest to the press platens has associated with it a plurality of pinch wheels 222 positioned above it and supported upon pivoted arms 224 secured to a shaft 226 carried by the frame. Resilient means engage the arms to urge the pinch wheels toward the underlying driven roll.

The pinch wheels 222 preferably are driven at the same speed and in the same direction as the underlying rolls 216, by means of sprocket chain 228 connected to the shaft 230 driven in the appropriate direction by the chain 218. By driving the outfeed rolls and pinch wheels simultaneously and uniformly, precise unloading of the panels from the press and properly aligned delivery to the stacking platform 204 is assured.

The framework also supports a pair of spaced, resiliently mounted bumpers 232 positioned above the pinch wheels 222 and located closely adjacent the outfeed ends of the press platen openings 22 immediately above the pinch wheels. This bumper arrangement provides a stop by which to limit the extent of insertion of unpressed panels P into the vacant platen opening 22 immediately above the opening from which a pressed panel P' is being ejected.

Figure 7:
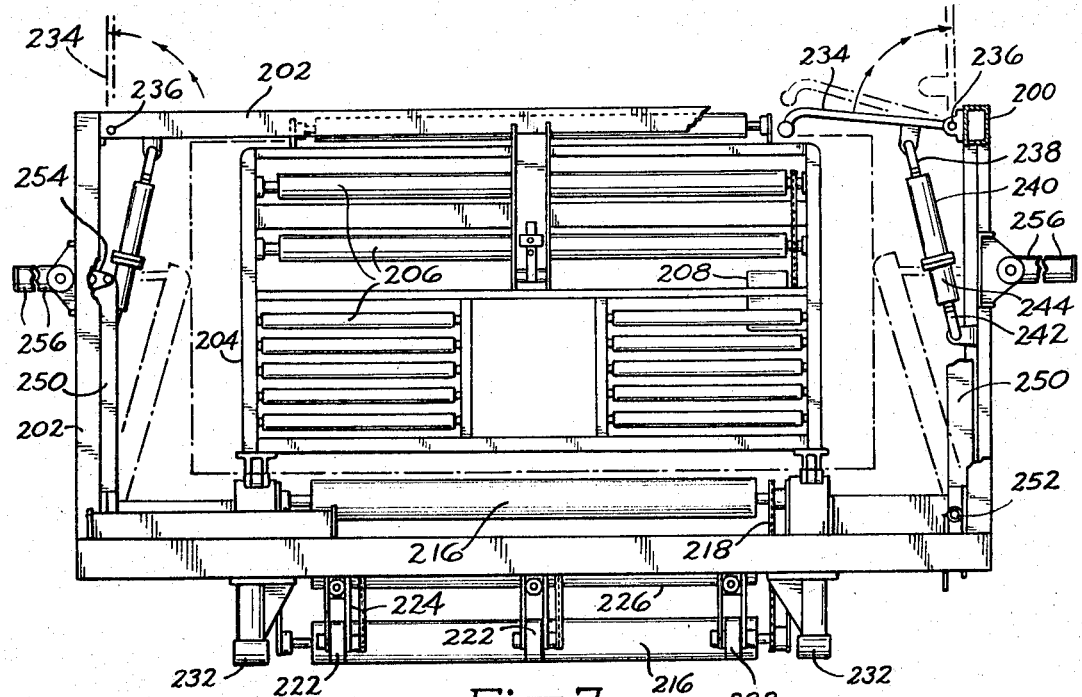
FIG. 7 is a foreshortened plan view of the unloading squaring stacker and associated mechanism, parts thereof being broken away to disclose details of construction, and parts also being shown in dotted lines and dot-and-dash lines in various positions of operation.

Referring now particularly to FIG. 7, means are provided on the unloading hoist for squaring the pressed panels delivered from the press to the outfeed platform 204. A pair of outboard gates 234 are mounted pivotally one adjacent each of the laterally spaced outboard vertical beams 200 of the frame for pivotal movement on vertical axes 236. Each of these gates is connected to the reciprocative piston rod 238 of the long stroke section 240 of the double ended pneumatic air cylinder. The piston rod 242 of the short stroke section 244 is connected pivotally to the framework. The gates thus are movable by section 240 to a fully retracted position extending outwardly from the framework to permit unloading of a stack of panels from the outfeed conveyor. The short stroke section 244 moves the gate through a small arc to engage the outboard edge of a panel and move the latter rearward into abutment with inboard straight edges 246.

Similarly, a pair of side gates 250 are mounted pivotally one adjacent each of the lateral inboard corners of the framework for pivotal movement on vertical axes 252. Each of these gates is connected pivotally to the reciprocative piston rod 254 of the pneumatic cylinder unit 256 which, in turn, is supported pivotally by the framework. One of the cylinders 256 is larger than the other, whereby its associated gate 250 is moved inward to a predetermined position to form a fixed straight edge against which the panels P' are squared. An adjustable connection is provided between this cylinder and gate to afford adjustment of said predetermined inward position. The side gates thus are movable between a retracted position adjacent the sides of the framework and an operative position inwardly thereof, whereby they engage the opposite side edges of a panel and align the latter centrally on the outfeed conveyor platform 204.

The sequence of operation of the apparatus described hereinbefore is as follows: Let it be assumed that the press is just opening following pressing of a plurality of panels, the emptied unloading hoist is in its elevated, normal rest position illustrated in dot and dash lines in FIG. 1, the loading hoist is at its lowermost position illustrated in full lines in FIG. 1, and a stack of unpressed panels P has been deposited upon the infeed conveyor for loading into the press. The operator, standing upon the loading hoist platform, then manually operates an electrical sequence start switch to initiate the sequential operation of the apparatus.

The loading hoist drive motor 48 thereupon is activated to elevate the hoist to its uppermost position. During this movement the feeler arm 122 engaging the upper panel of the stack effects operation of the electric motor 66 to bring the upper surface of the infeed roller 72 into horizontal alignment with the uppermost panel.

When the loading hoist reaches its uppermost position, at which the pusher heads 182 and 186 of the ejector system are aligned with the uppermost press platen opening 22, the ejector arms are extended by operation of the cylinder 164. The pusher heads thus engage the adjacent edge of the uppermost pressed panel and ejects the latter into the path of the aligned outfeed rollers 216. The ejector arms immediately retract, by actuation of the microswitch 190.

The partially ejected panel is gripped between the driven outfeed roll 216 and pinch wheels 222 which complete the extraction of the panel from the press. As the panel moves across the driven outfeed rolls for deposit upon the elevated outfeed conveyor 204, the panel engages and operates a microswitch 260 (FIG. 1) which activates the loading hoist clutch brake 46 to lower the hoist. When the actuating arm of microswitch 134 engages the next lower block 132 on the post 130, the loading hoist clutch brake is deactivated and the hoist is stopped at the position in which the pusher heads of the ejector arms are aligned with the next lower platen opening. Simultaneously with this movement the unloading hoist also is lowered to bring the driven outfeed rolls 216 into alignment with the same press opening. The ejector arms operate immediately to effect initial ejection of the pressed panel from said opening.

The uppermost press platen opening having thus been emptied, the operator now may insert the uppermost prepressed panel P from the stack. Until he does so, the components of the apparatus will remain in the attained positions. However, assuming the operator feeds the uppermost prepressed panel to the infeed driven roll 72, the leading edge of the panel first is aligned against the extended stop members 94, thus operating the microswitch 102 to retract the stop members and lower the pinch rolls 76 onto the panel. The panel thereupon is fed into the uppermost platen opening. Upon striking the resilient bumpers 232 the panel rebounds slightly so as to be confined entirely within the margins of the press platens. As this panel is delivered to the press opening, it clears microswitch 102 on the frame of the infeed mechanism, activating the loading hoist clutch brake 46, whereby said hoist is lowered to the position determined by the next lower block 132 on the post 130. The foregoing sequence of operations then is repeated until the entire press has been unloaded of pressed panels P' and loaded with prepressed panels P.

The unloading hoist, having reached the lowermost position illustrated in full lines in FIG. 1, then actuates a microswitch (not shown) which reverses motor 48' and elevates the hoist to a position at which the lowered outfeed conveyor platform 204 supporting the stack of pressed panels P' is at the proper level above the foundation 16 to deliver the stack to an offbearing conveyor. At this position a microswitch (not shown) is actuated to energize the drive motor 208 of the outfeed conveyor rolls, whereupon the stack of panels is removed from the hoist. Thereupon the hoist clutch brake 46' is energized to elevate the hoist to its uppermost position where it stands ready to repeat the foregoing cycle.

It is to be noted that if, for any reason, it is desired to feed panels into the press by hand, the frame 54 and supported assembly may be elevated to the upper end of the beams 52 to provide unobstructed access to the press under said assembly.

It will be apparent to those skilled in the art that various changes may be made in the number, size, shape and arrangement of parts described hereinbefore. For example, the hoists may be arranged to be indexed in the upward direction to effect loading and unloading of a press from the bottom toward the top, rather than in the reverse direction described hereinbefore. In such event the panel ejector mechanism will be positioned above the infeed roll 72 and the bumpers 232 will be positioned below the outfeed rollers 216. This and other changes may be made without departing from the spirit of this invention and the scope of the appended claims.

Having now described my invention and the manner in which it may be used, what I claim as new and desire to secure by Letters Patent is:

1. Apparatus for loading and unloading a multiplaten press of panel material, comprising
    (a) a main frame,
    (b) a loading hoist,
    (c) hoist drive means on the main frame supporting the loading hoist for vertical movement relative to said main frame,
    (d) a panel infeed frame mounted on the loading hoist,
    (e) a carriage,
    (f) carriage drive means on the infeed frame supporting the carriage for vertical movement relative to said frame,
    (g) panel infeed means on the carriage,
    (h) means on the loading hoist for supporting panels to be pressed adjacent the infeed means,
    (i) control means for the carriage drive means for starting and stopping movement of the carriage for aligning the infeed means with a panel on the hoist,
    (j) control means for the hoist drive means for starting and stopping movement of the loading hoist for aligning the infeed means with a press platen opening, and
    (k) panel ejector means mounted on the carriage for movement between a retracted position adjacent the infeed side of press platens and an extended position projecting into a press platen opening for engaging and ejecting a panel therefrom, (1) the ejector means being spaced vertically from the infeed means a distance substantially equal to the distance between adjacent press platen openings.

2. The apparatus of claim 1 wherein the hoist drive means comprises an electric motor and clutch brake, and the control means for the hoist drive means comprises
   (a) an electric switch in the circuit of the hoist clutch brake and mounted on the carriage, and
   (b) a plurality of switch operator means mounted adjacent the loading hoist for releasably engaging the switch, and operator means being positioned to correspond with the vertical positions of the press platen openings when the press is in open condition, and being operable to stop the hoist when the infeed means is aligned with a press platen opening.

3. The apparatus of claim 1 wherein the carriage drive means comprises an electric motor, and the control means for the carriage drive means comprises
   (a) an electric switch in the circuit of the carriage motor and mounted on the carriage, and
   (b) switch operator means mounted on the carriage and arranged to engage the uppermost panel of a stack supported on a loading hoist, for actuating the carriage drive means to move the infeed means into alignment with said panel.

4. The apparatus of claim 1 wherein the ejector means comprises
   (a) an elongated frame,
   (b) a pair of traveling block members on the frame movable toward and away from each other,
   (c) a fixed block member on the frame between the traveling block members,
   (d) a first pair of arm members pivotally interconnecting the fixed block member and one of the traveling block members,
   (e) a second pair of arm members pivotally interconnecting the fixed block member and the other traveling block member,
   (f) panel pusher head means at the pivot connection of each pair of arm members, and
   (g) drive means interconnecting the frame and traveling block members for moving the latter simultaneous in the same direction with respect to the fixed block member for extending and retracting the pusher head means relative to a press platen opening.

5. The apparatus of claim 1 including panel aligning abutment means on the carriage mounted for movement between an operative position traversing the plane of movement of a panel through the infeed means for aligning the leading edge of a panel parallel to the infeed means, and a retracted position removed from said plane permitting feeding of the aligned panel to a press platen opening.

6. The apparatus of claim 1 wherein the infeed means includes
   (a) a driven roll,
   (b) a pinch wheel mounted above the driven roll for movement toward and away from the latter, and
   (c) drive means engaging the pinch wheel for moving the latter.

7. The apparatus of claim 6 including
   (a) panel aligning abutment means on the carriage mounted for movement between an operative position traversing the plane of movement of a panel through the infeed rolls for aligning the leading edge of a panel parallel to the infeed rolls, and a retracted position removed from said plane permitting feeding of the aligned panel to a press platen opening, and
   (b) connecting means coupling the pinch wheel drive means to the panel aligning abutment means for moving the latter to operative position during movement of the pinch wheel away from the driven roll and for moving the abutment means to retracted position during movement of the pinch wheel toward the driven roll.

8. The apparatus of claim 1 including
   (a) an unloading hoist,
   (b) hoist drive means on the main frame supporting the unloading hoist for vertical movement relative to said main frame,
   (c) panel outfeed means on the unloading hoist, and
   (d) control means for the hoist drive means for starting and stopping movement of the unloading hoist for aligning the outfeed means with a press platen opening.

9. The apparatus of claim 8 including panel stop means on the unloading hoist spaced vertically from the outfeed means for abutment by a panel being loaded into a press platen opening adjacent the opening from which a pressed panel is unloaded.

10. The apparatus of claim 8 including panel-aligning gate means mounted on the unloading hoist for movement toward and away from panels deposited on the latter for aligning the edges of panels stacked on the hoist.

References Cited
UNITED STATES PATENTS

| | | | |
|---|---|---|---|
| 129,827 | 4/1964 | Hutter | 214—16.4 |
| 3,139,994 | 7/1964 | Chasar | 214—16.4 |
| 3,339,757 | 9/1967 | Nagaoka | 214—16.6 |

ROBERT G. SHERIDAN, *Primary Examiner.*

R. B. JOHNSON, *Assistant Examiner.*